Figure 1:
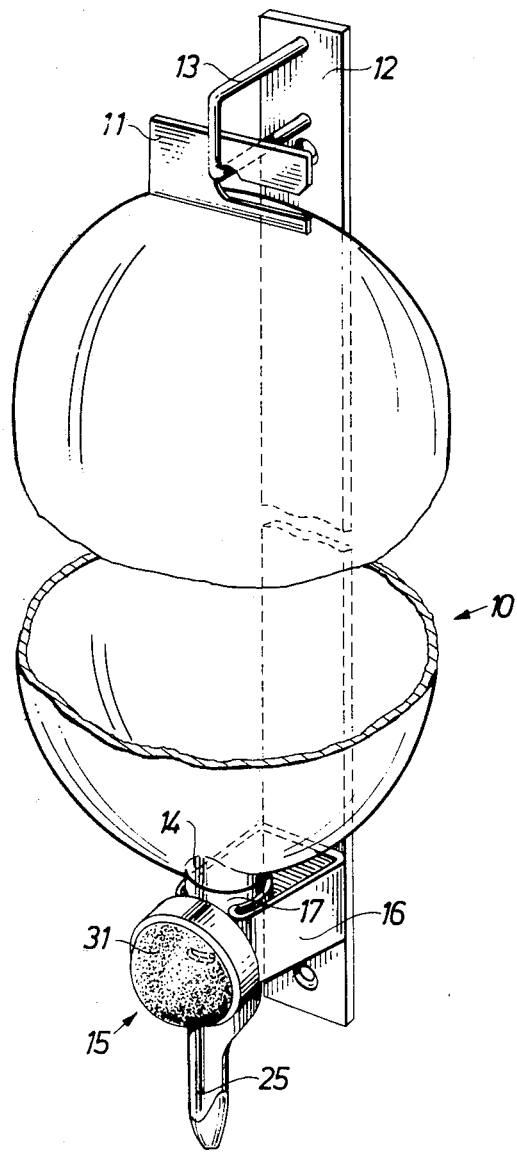

ary Examiner—David A. Scherbel
Attorney, Agent, or Firm—Fleit & Jacobson

United States Patent [19]
Ohlson

[11] 4,330,071
[45] May 18, 1982

[54] DISPENSING DEVICE FOR DISCHARGING A LIQUID OR PASTY PRODUCT FROM A CONTAINER, CONTAINING SUCH A PRODUCT

[75] Inventor: Gustav O. I. Ohlson, Tranas, Sweden
[73] Assignee: AB Tranås Rostfria, Tranås, Sweden
[21] Appl. No.: 197,196
[22] Filed: Oct. 15, 1980
[30] Foreign Application Priority Data
Oct. 15, 1979 [SE] Sweden ................................ 7908510
[51] Int. Cl.³ ............................................. G01F 11/08
[52] U.S. Cl. .................................... 222/207; 222/383; 417/566
[58] Field of Search ................ 417/566; 222/207, 214, 222/325, 380, 383

[56] References Cited
U.S. PATENT DOCUMENTS
3,715,060  2/1973  Benson .
3,952,924  4/1976  Benson .
4,168,020  9/1979  Benson .

FOREIGN PATENT DOCUMENTS
  43074 12/1973  Australia .
 325680  7/1970  Sweden .
7610830  5/1978  Sweden .

Primary Examiner—David A. Scherbel
Attorney, Agent, or Firm—Fleit & Jacobson

[57] ABSTRACT

A dispensing device for discharging a liquid or pasty product from a container comprises a valve housing, provided with a vertical through passage for said product, including an upper inlet section for connecting the valve housing to an outlet of a container, a lower outlet section, and an intermediate valve chamber, defined between two resilient disk-like valve members which are spaced apart in the longitudinal direction of said passage and provided with thickened hub portions by which they are mounted on a supporting pin, located centrally within the valve chamber. In order to facilitate a simplified and less expensive manufacture and assembly of the device, the supporting pin is formed integrally with the valve housing which, as a whole, is formed in one single piece. The supporting pin projects upwardly into the valve chamber from a partial bottom wall of the valve housing. Near its lower end, supporting pin has a shoulder on which the hub portion of the lower valve member rests. A retainer, acting on the upper end surface of the hub portion of the upper valve member, is mounted in axially fixed position within the inlet section of the through passage.

8 Claims, 3 Drawing Figures

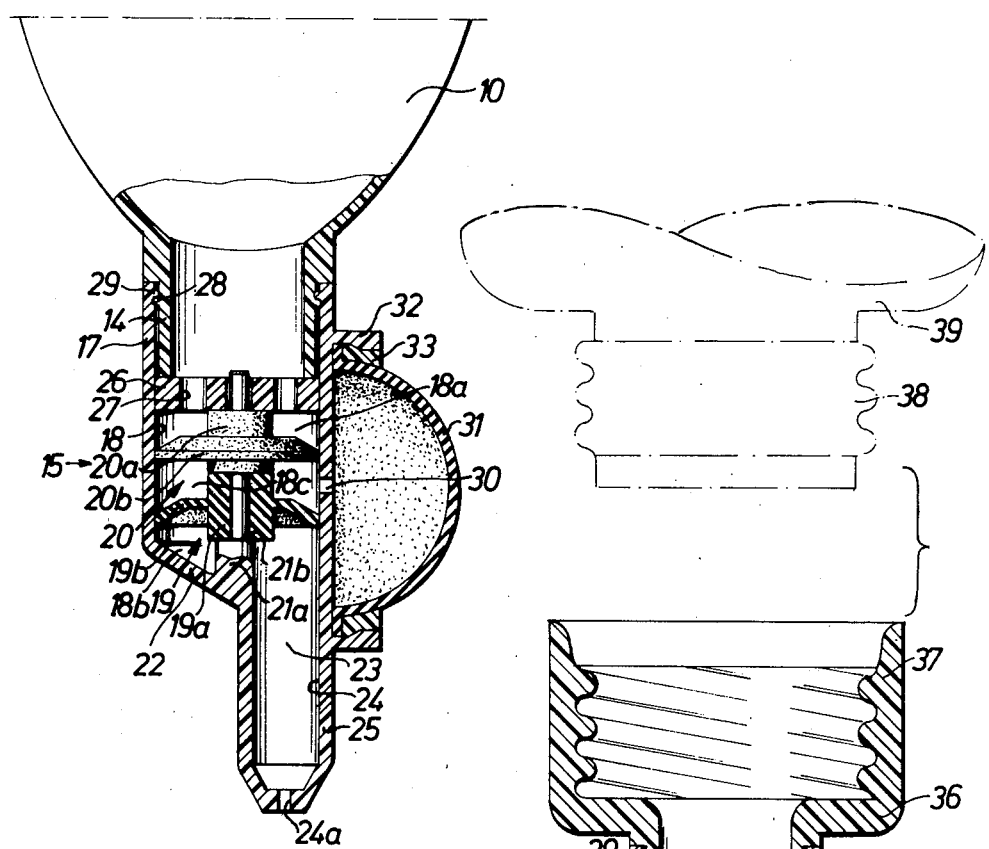
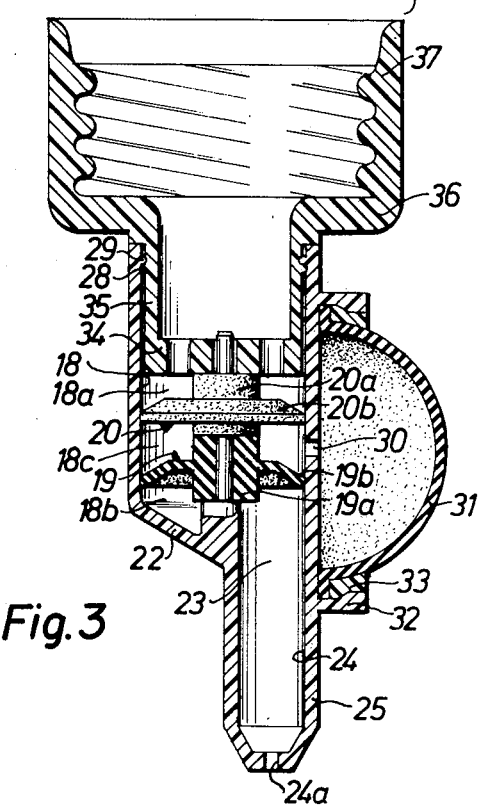

DISPENSING DEVICE FOR DISCHARGING A LIQUID OR PASTY PRODUCT FROM A CONTAINER, CONTAINING SUCH A PRODUCT

The present invention relates to a dispensing device for discharging a liquid or pasty product from a container, containing such a product.

More particularly, the invention relates to such a device of the kind, comprising a valve housing, provided with a generally vertically extending through passage for said product, said passage including an inlet section, located in an upper portion of the valve housing and serving to connect the valve housing to an outlet of a container, an outlet section, located in a lower portion of the valve housing, and an intermediate portion, containing a valve chamber, defined between two valve means which are spaced apart from each other in the longitudinal direction of said passage and which are formed by peripheral resiliently flexible generally funnel-shaped flanges of disk-like valve members, having thickened hub portions by which the valve members are mounted in axially fixed positions on a supporting pin located centrally within the valve chamber, the flexible peripheral flange of each valve member having its apex facing the inlet section of said through passage and being arranged, with its outer edge, to bear sealingly against the peripheral wall of the valve chamber, as long as any substantial pressure drop does not occur across said flange in a direction from its upper side and towards its lower side, while the flange is arranged, upon the occurrance of a pressure drop of sufficient magnitude across the same and in said direction, to be bent resiliently in a downward direction in order to define, between its outer edge and the peripheral wall of the valve chamber, a gap through which a flow of said product may pass the device further comprising a pressure means, located outside the valve housing and communicating with the valve chamber through an opening provided in the peripheral wall of the valve chamber, said pressure means being arranged, upon actuation thereof, temporarily to generate an increased pressure within the valve chamber, hereby causing a discharge of a certain quantity of said product from the valve chamber to the outlet section of the through passage, past the lower valve means.

In practice, devices of said kind, hitherto known, have been found to have certain drawbacks, relating especially to the manufacture and assembly of said devices. The invention therefore has had for its object to provide an improved device of said kind permitting a simplified and less expensive manufacture and assembly of the device.

According to the invention, for this purpose, there is provided a dispensing device of the kind initially specified which is primarily characterized in that the supporting pin for the two valve members is formed integrally with the valve housing which, as a whole, is formed as one single piece, the supporting pin projecting upwardly and into the valve chamber from a partial bottom wall of the valve housing partially closing the valve housing in a downward direction but leaving, at one side of the supporting pin, a free opening which terminates into an outlet passageway, formed in a portion of the valve housing projecting in a downward direction from said bottom wall, the supporting pin having a lower portion of enlarged cross-section, the upper end of which forms a shoulder on which the hub portion of the lower valve member rests with its lower end surface, the hub portion of the upper valve member being held in contact with the hub portion of the lower valve member by a retaining means, acting against the upper end surface of the hub portion of the upper valve member and provided in an axially fixed position within the inlet section of the through passage, above the upper valve member.

By forming the supporting pin as an integral portion of the valve housing and forming the valve housing, as a whole, in one single piece, as proposed according to the invention, the manufacture and assembly of the device may be considerably simplified and made less expensive.

According to a preferred embodiment of the invention, the retaining means may be formed by a disk, provided with through openings for the product to be dispensed and held in axially fixed position in the inlet section of the through passage of the valve housing by a sleeve, inserted in said inlet section and having a peripheral portion thereof in engagement with the wall of the inlet section.

Said sleeve, which may consist of an outlet pipe of a container or be formed by a lower portion of a separate connection piece for connecting the device to the container, may be connected to the valve housing by snap-in means permitting relative rotation between said sleeve and the valve housing. The retaining disk may be formed integrally with said sleeve.

Below the invention will be described in further detail, reference being had to the accompanying diagrammatic drawings, in which:

FIG. 1 shows a perspective view of a dispensing device according to an embodiment of the invention, selected by way of example, said device being mounted on a lower end portion of a bag-like container which, together with the dispensing device, is held by a holder intended to be attached to a wall, while FIG. 2 shows a vertical longitudinal section through the dispensing device according to FIG. 1, also illustrating the adjacent lower end portion of the container, and FIG. 3 shows a corresponding longitudinal section through the dispensing device, which, in this case, is not mounted on a container but on a separate connection piece by which the dispensing device may be connected to a container.

In FIG. 1, reference numeral 10 generally designates a bag-like container for a liquid or pasty product, such as liquid soap or a disinfectant. At its upper end, container 10 is provided with a flat hook 11 by which the container may be mounted suspending from an eye 13 of a wall mounting 12. The container 10 may suitably consist of a blow-moulded bag consisting of a thin translucent non-rigid plastic, such as polyethylene. The container is permanently closed at its upper end, while, at its lower end, it is provided with an outlet pipe or neck 14 by which it is removably connected to a dispensing device, generally designated 15. By means of said device 15, small doses of the product contained in the container 10 may be discharged therefrom in a convenient manner. The dispensing device 15 is supported by a yoke-shape member 16 projecting from the lower portion of wall mounting 12.

As can be seen from FIG. 2, the body of the dispensing device 15 is formed by a valve housing 17 which, as a whole, is formed in one single piece. Said valve housing 17 may be formed as an injection-moulded piece and consist of a stiff plastic, such as polypropene. Reference numeral 18 designates a vertical through passage provided in valve housing 17 to form a passageway through the valve housing for the product contained in container 10. Said passage 18 includes an inlet section 18a of circular cross-section, provided at the upper end of valve housing 17, an outlet section 18b at the lower end of valve housing 17, and an intermediate valve chamber 18c of circular cross-section, located between inlet section 18a and outlet section 18b. Said valve chamber 18c is defined between two valve members 19 and 20 which are spaced apart in the longitudinal direction of passage 18 and consist of circular disks of nitrile rubber or any other suitable elastic material. Each valve member 19 and 20, respectively, has a central thickened hub portion 19a and 20a, respectively, and a peripheral resiliently flexible generally funnel-shaped flange 19b and 20b, respectively, the apex of which is turned in upward direction, i.e. towards the inlet section 18a of passage 18. By means of their hub portions 19a and 20a, the two valve members 19 and 20 are mounted on a supporting pin, or post, 21 located centrally within valve chamber 18c and extending in an upward direction within said chamber from a partial bottom wall 22 of valve housing 17. Said bottom wall 22 closes valve housing 17 partially in a downward direction while simultaneously leaving, on one side of supporting pin 21, a free opening 23, terminating in an outlet passageway 24, formed in a thin portion 25 of valve housing 17 extending in a downward direction from bottom wall 22, said outlet passageway terminating, at its lower end, in a narrow discharge opening 24a.

At its lower end, supporting pin 21 has a portion 21a of increased cross-section forming a shoulder 21b on which the lower valve member 19 rests with its hub portion 19a. The upper valve member 20, in its turn, rests with its hub portion 20a on the hub portion 19a of the lower valve member 19 and it is axially fixed by means of a retaining disk 26 which, by means of a central hollow portion, is mounted on an upper end portion of supporting pin 21 extending above hub portion 20a. Said retaining disk 26, which is provided with a number of through holes 27, forming passageways for the product contained in container 10, is held in its position, shown in FIG. 2, by means of a reduced-diameter portion of the outlet pipe 14 of container 10 projecting into the inlet section 18a of passage 18 and resting with its lower end against disk 26. Said outlet pipe 14 is axially fixed to valve housing 17 through snap-in engagement between an outer circumferentially extending ridge 28 on outlet pipe 14 and an inner circumferentially extending ridge 29 on valve housing 17, located near the upper end of inlet section 18a. Said two ridges 28 and 29, which form cooperating snap-in means, permit relative rotation to occur between the outlet pipe 14 of container 10 and valve housing 17.

The two flexible funnel-shaped flanges 19b and 20b of valve members 19 and 20 are normally in sealing contact with the peripheral wall of valve chamber 18c, formed by valve housing 17, then preventing any flow of the liquid or pasty product past them. This is the condition as long as any pressure drop does not exist across any of said flanges in a direction from its upper side and towards its lower side. However, the peripheral flange of each valve member may be bent resiliently in a downward direction if a pressure drop of sufficient magnitude occurs across the flange in said direction. When so bent, flange 19b or 20b, respectively, will cause a gap to occur between its outer edge and the wall of valve chamber 18c, said gap permitting a flow of the product to pass therethrough and past the valve flange.

Reference numeral 30 designates a narrow hole provided in the peripheral wall of valve chamber 18c at a position between the two valve flanges 19b and 20b. Said hole communicates with a pressure means provided on the external side of valve housing 17 and serving to permit an overpressure to be temporarily generated within valve chamber 18c between the two valve flanges 19b and 20b. In the illustrated embodimemt, said pressure means is formed by a manually compressible pressure bulb 31 of semispherical shape which, by means of a retaining or locking ring 33, is secured in a holder 32 formed integrally with valve housing 17. Said pressure bulb 31 may for instance consist of ethylene vinyl acetate. When the pressure bulb 31 is compressed, an overpressure will temporarily be generated within valve chamber 18c and cause the peripheral flange 19b of lower valve member 19 to be bent downwardly. A certain quantity of the liquid or pasty product will then be discharged from valve chamber 18c to outlet passageway 24. Simultaneously, the peripheral flange 20b of upper valve member 20 will be forced against the peripheral wall of valve chamber 17 under increased pressure. When the pressure bulb 31 is again released, it will temporarily cause a vacuum in valve chamber 18c. This will cause the lower valve flange 19b to return into sealing contact with the peripheral wall of valve chamber 17, while the upper valve flange 20b, instead, will be bent downwardly and permit valve chamber 18c to be refilled from the inlet section 18a of passage 18, located above flange 20b.

The dispensing device, shown in FIG. 3, is substantially identical with the device above described and shown in FIG. 2. Therefore, corresponding elements have been designated by the same reference numerals in both figures.

In FIG. 3, the separate retaining disk 26 of FIG. 2 has been replaced by a corresponding disk-like retaining means 34 formed integrally with a sleeve 35, inserted into the inlet section 18a of passage 18 and forming a lower portion of a separate connection piece 36. At its upper end, connection piece 36 has an internally threaded socket 37 by which it may be mounted on an externally threaded outlet pipe 38 of a container 39, shown in dash-dotted lines.

The dispensing device above described and shown in the drawings may be manufactured at surprisingly low costs. Therefore, if used in combination with a blow-moulded container of the kind shown in FIG. 2, it is well suited, together with said container, to form a complete disposable package and dispenser for a liquid or pasty product.

A special advantage of the device is also to be found in the rotatable connection between valve housing 17 and container 10, or connection piece 36, respectively, which permits pressure bulb 31 to be oriented in any desired direction.

What is claimed is:

1. A dispensing device for discharging a liquid or pasty product from a container, containing such a product, said device comprising a valve housing, provided with a generally vertically extending through passage for said product, said passage including an inlet section, located in an upper portion of the valve housing and serving to connect the valve housing to an outlet of a container, an outlet section, located in a lower portion of the valve housing, and an intermediate portion, containing a valve chamber, defined between two valve means which are spaced apart from each other in the longitudinal direction of said passage and which are formed by peripheral resiliently flexible generally funnel-shaped flanges of disk-like valve members, having thickened hub portions by which the valve members are mounted in axially fixed positions on a supporting pin located centrally within the valve chamber, the flexible peripheral flange of each valve member having its apex facing the inlet section of said through passage and being arranged, with its outer edge, to bear sealingly against the peripheral wall of the valve chamber, as long as any substantial pressure drop does not occur across said flange in a direction from its upper side and towards its lower side, while the flange is arranged, upon the occurrance of a pressure drop of sufficient magnitude across the same and in said direction, to be bent resiliently in a downward direction in order to define, between its outer edge and the peripheral wall of the valve chamber a gap through which a flow of said product may pass, the device further comprising a pressure means, located outside the valve housing and communicating with the valve chamber through an opening provided in the peripheral wall of the valve chamber, said pressure means being arranged, upon actuation thereof, temporarily to generate an increased pressure within the valve chamber, hereby causing a discharge of a certain quantity of said product from the valve chamber to the outlet section of the through passage, past the lower valve means, characterized in that the supporting pin for the two valve members is formed integrally with the valve housing which, as a whole, is formed as one single piece, the supporting pin projecting upwardly and into the valve chamber from a partial bottom wall of the valve housing, partially closing the valve housing in a downward direction but leaving, at one side of the supporting pin, a free opening which terminates into an outlet passageway, formed in a portion of the valve housing projecting in a downward direction from said bottom wall, the supporting pin having a lower portion of enlarged cross-section, the upper end of which forms a shoulder on which the hub portion of the lower valve member rests with its lower end surface, the hub portion of the upper valve member being held in contact with the hub portion of the lower valve member by a retaining means, acting against the upper end surface of the hub portion of the upper valve member and provided in an axially fixed position within the inlet section of the through passage, above the upper valve member.

2. A device according to claim 1, characterized in that said retaining means is formed by a disk, provided with through holes for the product and held in axially fixed position in the inlet section of the through passage by means of a sleeve, inserted in the inlet section of the through passage, above said disk, and having a peripheral portion thereof provided in engagement with the wall of the inlet section of through passage, formed by the valve housing.

3. A device according to claim 2, characterized in that said sleeve is formed by an outlet sleeve of a container which is connected to the device.

4. A device according to claim 2, characterized in that said sleeve is formed by a lower portion of a separate connection piece for connecting the device to a container.

5. A device according to any one of claims 2–4, characterized in that said sleeve is connected to the valve housing by snap-in means permitting relative rotation between said sleeve and the valve housing.

6. A device according to claim 5, characterized in that said snap-in means are formed by at least one inner peripheral ridge on the wall of the inlet section and at least one cooperating outer peripheral ridge on said sleeve.

7. A device according to any one of claims 2–4, characterized in that the retaining disk is formed integrally with said sleeve.

8. A device according to any one of claims 2–4, characterized in that the retaining means is provided with a central hole for receiving an upper end portion of the supporting pin projecting above the upper valve member.

* * * * *